(12) United States Patent
Huang et al.

(10) Patent No.: US 12,444,387 B2
(45) Date of Patent: Oct. 14, 2025

(54) DISPLAY IMAGE COMPENSATION METHOD, DISPLAY AND STORAGE MEDIUM

(71) Applicant: HKC CORPORATION LIMITED, Shenzhen (CN)

(72) Inventors: Peidi Huang, Shenzen (CN); Jie Chen, Shenzen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/899,264

(22) Filed: Sep. 27, 2024

(65) Prior Publication Data
US 2025/0104667 A1   Mar. 27, 2025

(30) Foreign Application Priority Data
Sep. 27, 2023  (CN) .......................... 202311256027.2

(51) Int. Cl.
*G09G 5/02*      (2006.01)
*G06F 3/01*      (2006.01)

(52) U.S. Cl.
CPC ............. *G09G 5/02* (2013.01); *G06F 3/013* (2013.01); *G09G 2320/0242* (2013.01); *G09G 2320/0666* (2013.01)

(58) Field of Classification Search
CPC ....................................................... G06F 3/013
See application file for complete search history.

(56) References Cited

U.S. PATENT DOCUMENTS

| | | |
|---|---|---|
| 6,831,948 B1 | 12/2004 | Van Dijk et al. |
| 6,911,963 B2 | 6/2005 | Baba et al. |
| 7,486,730 B2 | 2/2009 | Van Dijk |
| 8,115,776 B2 | 2/2012 | Selbrede et al. |
| 9,966,016 B2 | 5/2018 | Hsieh et al. |
| 10,504,399 B2 | 12/2019 | Trythall |
| 2007/0222861 A1 | 9/2007 | Enami |

(Continued)

FOREIGN PATENT DOCUMENTS

| | | |
|---|---|---|
| CN | 101026777 A | 8/2007 |
| CN | 101185112 A | 5/2008 |

(Continued)

*Primary Examiner* — Gustavo Polo
(74) *Attorney, Agent, or Firm* — Franklin & Associates International Inc; Matthew F. Lambrinos

(57) ABSTRACT

The present disclosure provides a display image compensation method, a display and a storage medium. The display image compensation method includes: when an eye movement behavior of a target subject is monitored, determining a compensation area in a display image based on the eye movement behavior, the compensation area being an area where a color break up phenomenon occurs in the display image during watching of the target subject due to the eye movement behavior; acquiring a current display color value of the compensation area, and determining first difference information between the current display color value and a deviation color value of the compensation area; and determining a color compensation parameter based on the first difference information, and adjusting an image color of the compensation area in the display image according to the color compensation parameter.

15 Claims, 5 Drawing Sheets

Determining a compensation area in a display image based on the eye movement behavior when an eye movement behavior of a target subject is monitored — S101

Acquiring a current display color value of the compensation area, and determining first difference information between the current display color value and a deviation color value of the compensation area — S103

Determining a color compensation parameter based on the first difference information, and adjusting an image color of the compensation area in the display image according to the color compensation parameter — S105

(56) References Cited

U.S. PATENT DOCUMENTS

2012/0026203 A1    2/2012  Liu et al.
2018/0301076 A1*  10/2018  Trythall ................ G09G 3/003

FOREIGN PATENT DOCUMENTS

| CN | 105654918 | A | 6/2016 |
| CN | 107968937 | A | 4/2018 |
| CN | 108107613 | A | 6/2018 |
| JP | 2002311937 | A | 10/2002 |
| TW | 201035529 | A | 10/2010 |

* cited by examiner

| | Color | Direct representation | RGB macro indication | |
|---|---|---|---|---|
| * | Pure Green | 0x00ff00 | RGB(0, 255, 0) | |
| * | Cyan | 0xffff00 | RGB(0, 255, 255) | Note: Cyan=blue+green |
| * | Medium Gray | 0x7f7f7f | RGB(127, 127, 127) | |
| * | Yellow | 0x00ffff | RGB(255, 255, 0) | Note: Yellow=red+green |

DISPLAY IMAGE COMPENSATION METHOD, DISPLAY AND STORAGE MEDIUM

CROSS-REFERENCE TO RELATED APPLICATIONS

The present disclosure claims all the benefits of the Chinese patent application No. 202311256027.2, filed on Sep. 27, 2023 before the China National Intellectual Property Administration of the People's Republic of China, entitled "Display Image Compensation Method, Display And Storage Medium", the contents of which is explicitly incorporated herein by reference in its entirety.

FIELD

The disclosure relates to the technical field of display, in particular to a display image compensation method, a display and a storage medium.

BACKGROUND

With upgrading of screens and rapid development of various new technologies in the photoelectric display industry, more and more new technologies in the industry have brought brand new experiences to users. At present, LCDs (Liquid Crystal Displays) enjoy the largest market share, and thus a technical development direction of improving LCD display effect is still one of main developing directions of products today. Currently, there is a brand-new technology, namely, a color sequential method, which provides a better direction and better effect for development of LCD products and miniLED products.

Specifically, LCD products in the related art have low light transmittance due to presence of polarizers and color filters, and thus backlight brightness of LCD products needs to be high to ensure brightness in image displaying. On this basis, the color filters can be eliminated by using the color sequential method, which improves light transmittance and reduces power consumption of the products.

With the color sequential method eliminating the color filters, in order to realize RGB three-color displaying, a solution adopted is to flash R, G and B frames to present color images by visual persistence. Principle of the color sequential method is shown in FIG. 1. Specifically, pixel-level miniLED lamp beads can be used to display RGB three colors respectively by flashing three times in a period of one frame, and the human eye can finally see a color composed of three RGB colors in a period of one frame by the visual persistence principle. For example, when white needs to be displayed, a miniLED lamp bead displays red in ⅓ frame time, green in ⅓ frame time and blue in ⅓ frame time, and thus finally white can be seen in this frame time.

However, adoption of the color sequential method usually results in a color break up phenomenon while a user is watching display images. For example, when a first ⅓ frame is switched to a second ⅓ frame, the user's sight has moved, and positions where the red frame and the blue frame fall on retina vary and do not overlap, thus resulting in the color break up phenomenon as shown in FIG. 2, which affects the user's watching experience.

SUMMARY

Embodiments of the present disclosure at least provide a display image compensation method, a display and a storage medium.

In a first aspect, an embodiment of the present disclosure provides a display image compensation method applied to a color sequential display, including:

when an eye movement behavior of a target subject is monitored, determining a compensation area in a display image based on the eye movement behavior, wherein the compensation area is an area where a color break up phenomenon occurs in the display image during watching of the target subject due to the eye movement behavior;

acquiring a current display color value of the compensation area, and determining first difference information between the current display color value and a deviation color value of the compensation area; and determining a color compensation parameter based on the first difference information, and adjusting an image color of the compensation area in the display image according to the color compensation parameter.

In some embodiments, determining the first difference information between the current display color value and the deviation color value corresponding to the compensation area includes:

monitoring eye movement information corresponding to the eye movement behavior, the eye movement information including an eye movement speed and an eye movement trajectory;

determining a deviation color value corresponding to the compensation area based on the eye movement information; and determining the first difference information according to a difference between the display color value and the deviation color value.

In some embodiments, the method further includes:

determining multiple pieces of eye movement information to be tested in advance, and determining motion information of a photographing subject corresponding to each piece of the eye movement information to be tested;

collecting a display image of the color sequential display under the motion information by the photographing subject;

determining a color break up image in the display image, and determining a display color value corresponding to a compensation area in the color break up image; and training a color model to be trained based on the color break up image and the corresponding display color value to obtain a target color model, so as to determine the deviation color value corresponding to the compensation area based on the target color model.

In some embodiments, determining multiple pieces of eye movement information to be tested in advance includes:

determining a target eye movement behavior among a plurality of preset eye movement behaviors, the target eye movement behavior being configured to characterize an eye movement behavior of the target subject with a frequency meeting a preset frequency when the target subject watches the display image; and determining the eye movement information to be tested based on the eye movement information corresponding to the target eye movement behavior.

In some embodiments, the display color value includes an RGB value, and determining the display color value corresponding to the compensation area in the color break up image includes:

positioning a lamp bead in the color sequential display corresponding to the compensation area in the color break up image;

determining coordinates of the compensation area based on the lamp bead; and looking up an RGB value corresponding to the coordinates through a preset lookup statement.

In some embodiments, the compensation area includes a plurality of sub-areas, and acquiring the current display color value of the compensation area includes:

acquiring edge position information of each of the sub-areas, and reading a color value corresponding to the edge position information of each of the sub-areas to obtain a color value set; and determining the color value set as the current display color value of the compensation area.

In some embodiments, the display image compensation method further includes:

determining a target sub-area among the sub-areas in which a color value corresponding to the edge position information is the same as the deviation color value; and determining second difference information between a target color value corresponding to the target sub-area and the display color value, and determining color compensation parameters based on the second difference information, so as to adjust an image color corresponding to the target sub-area based on the color compensation parameters.

In a second aspect, an embodiment of the present disclosure provides a display image compensation device including:

a first determination unit configured to, when an eye movement behavior of a target subject is monitored, determine a compensation area in a display image based on the eye movement behavior, wherein the compensation area is an area where a color break up phenomenon occurs in the display image during watching of the target subject due to the eye movement behavior;

a second determination unit configured to acquire a current display color value of the compensation area, and determine first difference information between the current display color value and a deviation color value of the compensation area; and a compensation unit configured to determine a color compensation parameter based on the first difference information, and adjust an image color of the compensation area in the display image according to the color compensation parameter.

In a third aspect, an embodiment of the present disclosure provides a display including a processor, a memory and a bus, wherein the memory is configured to store computer-readable instructions, and when the display operates, the processor communicates with the memory through the bus and executes the above first aspect or the steps in any embodiment in the first aspect when the computer-readable instructions are executed by the processor.

In a fourth aspect, an embodiment of the present disclosure provides a computer-readable storage medium on which computer-readable instructions are stored, wherein the steps of the display image compensation method in any embodiment in the first aspect are executed when the computer-readable instructions are executed by a processor.

Compared with the related art, the above technical solutions provided by the embodiments of the disclosure has the following advantages: in the embodiments of the disclosure, when an eye movement behavior of a target subject is monitored, a compensation area in a display image is determined based on the eye movement behavior. The compensation area is an area where a color break up phenomenon occurs in the display image during watching of the target subject due to the eye movement behavior. Next, a current display color value of the compensation area is acquired, and first difference information between the current display color value and a deviation color value of the compensation area is determined. Then, a color compensation parameter is determined based on the first difference information, and an image color of the compensation area in the display image is adjusted according to the color compensation parameter, so as to Compensate for the display image where a color break up phenomenon occurs to improve the user's watching experience.

BRIEF DESCRIPTION OF THE DRAWINGS

In order to more clearly explain the technical solutions of the embodiments of the present disclosure, the accompanying drawings that are required to be used in the embodiments are briefly described below, and the accompanying drawings herein are incorporated into and constitute a part of the present specification, and these drawings illustrate embodiments in accordance with the present disclosure, and are used to explain the technical solutions of the present disclosure together with the specification. It should be understood that the following drawings merely show some embodiments of the present disclosure and thus should not be seen as limiting the scope, and for those of ordinary skill in the art, other related drawings can be obtained according to these drawings without making inventive efforts.

DETAILED DESCRIPTION

Figure 1:
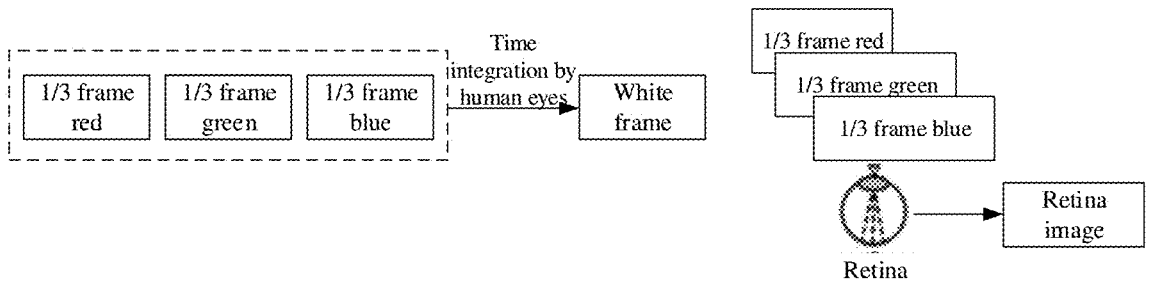
FIG. 1 shows a schematic diagram of a color sequential method according to an embodiment of the present disclosure.

In order to make objects, technical solutions, and advantages of embodiments of the disclosure clearer, the technical solutions in the embodiments of the disclosure will be clearly and fully described below in combination with the accompanying drawings in the embodiments of the disclosure. Obviously, the embodiments to be described are part of embodiments but not all embodiments of the disclosure. Components of embodiments of the present disclosure generally described and illustrated in the accompanying drawings herein may be arranged and designed in a variety of different configurations. Accordingly, the following detailed description of embodiments of the disclosure provided in the accompanying drawings is not intended to limit the scope of the claimed disclosure, but merely represents selected embodiments of the disclosure. Based on the embodiments in the disclosure, all other embodiments obtained by those skilled in the art without inventive work shall fall within the scope of the disclosure.

It should be noted that: like reference numerals and letters refer to like items in the following drawings, and therefore, once an item is defined in a drawing, it is not necessary to further define and explain the item in the subsequent drawings.

The term "and/or" herein merely describes an associative relationship and indicates that there may be three relationships. For example, A and/or B may mean: three cases of A alone, A and B at the same time, and B alone. In addition, the term "at least one" herein means any one of a plurality or any combination of at least two of a plurality, for example, including at least one of A, B, and C may mean including any one or more elements selected from the group consisting of A, B and C.

The study found that with upgrading of screens and rapid development of various new technologies in the photoelectric display industry, more and more new technologies in the industry have brought brand new experiences to users. At present, LCDs (Liquid Crystal Displays) enjoy the largest market share, and thus a technical development direction of improving LCD display effect is still one of main developing directions of products today. Currently, there is a brand-new technology, namely, a color sequential method, which provides a better direction and better effect for development of LCD products and miniLED products.

Specifically, LCD products in the related art have low light transmittance due to presence of polarizers and color filters, and thus backlight brightness of LCD products needs to be high to ensure brightness in image displaying. On this basis, the color filters can be eliminated by using the color sequential method, which improves light transmittance and reduces power consumption of the products.

With the color sequential method eliminating the color filters, in order to realize RGB three-color displaying, a solution adopted is to flash R, G and B frames to present color images by visual persistence. Principle of the color sequential method is shown in FIG. 1. Specifically, pixel-level miniLED lamp beads can be used to display RGB three colors respectively by flashing three times in a period of one frame, and the human eye can finally see a color composed of three RGB colors in a period of one frame by the visual persistence principle. For example, when white needs to be displayed, a miniLED lamp bead displays red in ⅓ frame time, green in ⅓ frame time and blue in ⅓ frame time, and thus finally white can be seen in this frame time.

Figure 2:
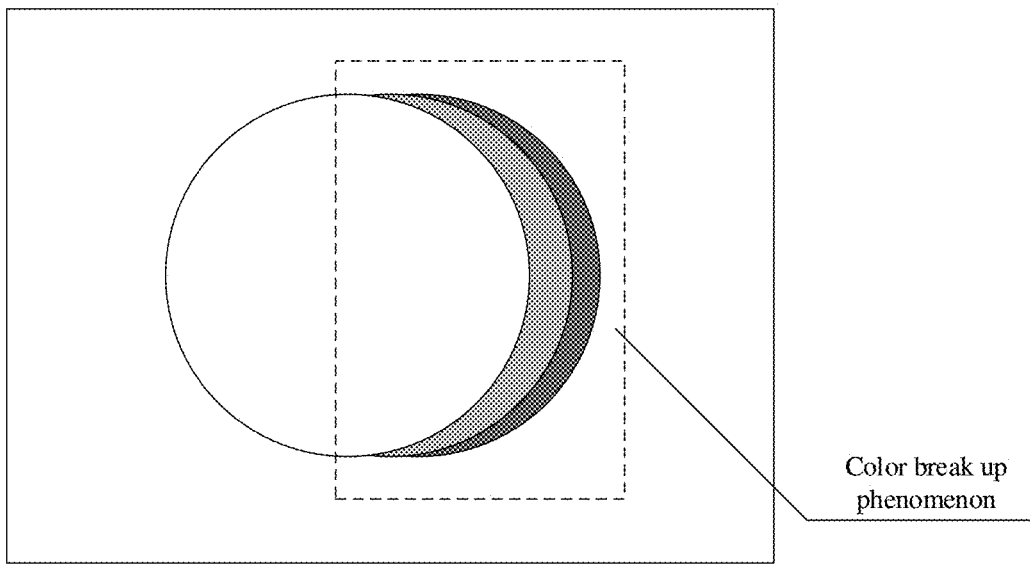
FIG. 2 shows a schematic diagram of a color break up phenomenon according to an embodiment of the present disclosure.

However, adoption of the color sequential method usually results in a color break up phenomenon while a user is watching display images. For example, when a first ⅓ frame is switched to a second ⅓ frame, the user's sight has moved, and positions where the red frame and the blue frame fall on retina vary and do not overlap, thus resulting in the color break up phenomenon as shown in FIG. 2, which affects the user's watching experience.

Based on the above study, the disclosure provides a display image compensation method, a display and a storage medium. In the embodiment of the disclosure, when an eye movement behavior of a target subject is monitored, a compensation area in a display image is determined based on the eye movement behavior. The compensation area is an area where a color break up phenomenon occurs in the display image during watching of the target subject due to the eye movement behavior. Next, a current display color value of the compensation area is acquired, and first difference information between the current display color value and a deviation color value of the compensation area is determined. Then, a color compensation parameter is determined based on the first difference information, and an image color of the compensation area in the display image is adjusted according to the color compensation parameter, so as to Compensate for the display image where a color break up phenomenon occurs to improve the user's watching experience.

In order to facilitate understanding of the embodiment, firstly, a display image compensation method disclosed in the embodiment of the disclosure is described in detail, and an executive subject of the display image compensation method according to the embodiment of the disclosure is generally a display with certain computing power. In some possible implementations, the display image compensation method can be realized by calling computer-readable instructions stored in a memory by a processor.

Figure 3:
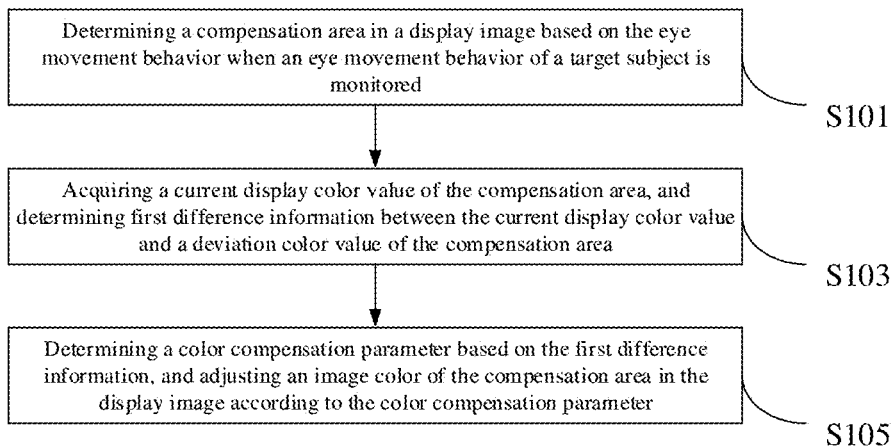
FIG. 3 shows a flowchart of a display image compensation method according to an embodiment of the present disclosure.

FIG. 3 is a flowchart of a display image compensation method according to an embodiment of the present disclosure applied to a color sequential display. The method includes steps S101 to S105.

In step S101, when an eye movement behavior of a target subject is monitored, a compensation area in a display image is determined based on the eye movement behavior. The compensation area is an area where a color break up phenomenon occurs in the display image during watching of the target subject due to the eye movement behavior.

In step S103, a current display color value of the compensation area is acquired, and first difference information between the current display color value and a deviation color value of the compensation area is determined.

In step S105, a color compensation parameter is determined based on the first difference information, and an image color of the compensation area in the display image is adjusted according to the color compensation parameter.

In the embodiment of the present disclosure, the color sequential display can be display products with backlight, such as LCD products and miniLED backlight products. The eye movement behavior can be an eyeball movement behavior of the target subject, that is, relative displacement occurs between the eyeball and a display area of the color sequential display. Specifically, the eye movement behavior may include: saccade, eyeball following, reading, free-style search, and the like. The saccade means that the eyeball is stimulated by an interesting object around a visual field thereof and jumps suddenly, which is a process in which the eyeball moves to the object. The eyeball following means that the eyeball follows movement of an object concerned in the visual field. The reading means that the eyeball may exhibit step-type eyeball movement during reading, including alternating saccade and fixation. The free-style search means irregular and complicated movement in all directions of the visual field of the eyeball.

Considering that in one frame, when the target subject has an eye movement behavior, positions where RGB components of an image at the same point scanned in a time sequence fall on the retina vary, and thus human eyes sense a color break up (hereinafter abbreviated as CBU) phenomenon of the image.

Based on this, an imaging image of the display image displayed by the color sequential display in eyes of the target subject can be calculated based on an eye movement speed and an eye movement trajectory of the eye movement behavior, and a compensation area in which a color break up phenomenon occurs can be determined based on the imaging image.

In the embodiment of the present disclosure, the display color value may be a current RGB value of the compensation area, and the RGB value respectively includes an R channel color value, a G channel color value and a B channel color value. Here, a color value of each color channel ranges from 0 to 255. For example, the RGB value may be (100,100, 100). Similarly, the deviation color value is an RGB value of the compensation area in a case where the color break up phenomenon occurs.

When the deviation color value is determined, the imaging image can be input into a target color model, so that the target color model calculates by a color algorithm the deviation color value of the compensation area when the color break up phenomenon occurs. Then, a between the display color value and the deviation color value can be calculated, and the first difference information can be determined based on the difference. The first difference information can be used to compensate for the deviation color value in the imaging image to the display color value.

For example, if the display color value is (100, 100, 100) and the deviation color value is (0, 100, 100), the difference between the display color value and the deviation color value is (100, 0, 0), which can be included in the first difference information. It is instructed to compensate for a color value of 100 in the R channel of the display color value through the first difference information.

In the embodiment of the present disclosure, a position of the compensation area in the display image can be determined first, and color compensation parameters corresponding to the position can be adjusted. Specifically, a tcon board is controlled by an algorithm controller to output timing, and the tcon board controls a driver to output replaced colors.

Specifically, color channels to be compensated can be determined, and the tcon board is controlled by the algorithm controller to output the timing. For example, if the color channels to be compensated are the R channel and G channel, the algorithm controller controls the tcon board to output timing involving the R channel and G channel, and controls the driver by the tcon board to compensate color channels indicated by the timing.

It is known from the above description that in the embodiment of the disclosure, when an eye movement behavior of a target subject is monitored, a compensation area in a display image is determined based on the eye movement behavior. The compensation area is an area where a color break up phenomenon occurs in the display image during watching of the target subject due to the eye movement behavior. Next, a current display color value of the compensation area is acquired, and first difference information between the current display color value and a deviation color value of the compensation area is determined. Then, a color compensation parameter is determined based on the first difference information, and an image color of the compensation area in the display image is adjusted according to the color compensation parameter, so as to compensate the display image where a color break up phenomenon occurs to improve the user's watching experience.

In an alternative embodiment, the compensation area includes a plurality of sub-areas, and acquiring the current display color value of the compensation area in step S103 specifically includes the following process.

S1031: edge position information of each of the sub-areas is acquired, and a color value corresponding to the edge position information of each of the sub-areas is read to obtain a color value set; and S1032: the color value set is determined as the current display color value of the compensation area.

In the embodiment of the disclosure, considering that the display image displayed in the color sequential display may be complicated in actual use, resulting in poor color compensation effect of the compensation area. Therefore, the divided compensation area can be subdivided to obtain a plurality of sub-areas, and color compensation is performed on the sub-areas separately, thereby refining compensation granularity and improving the compensation effect.

Figure 4:
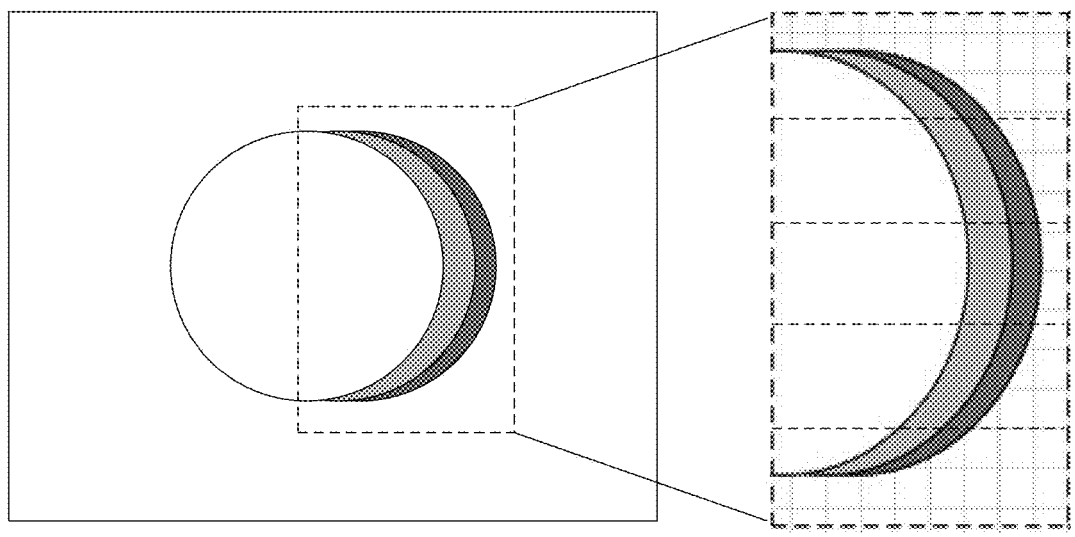
FIG. 4 shows a schematic diagram of subdivision of a compensation area according to an embodiment of the present disclosure.

Specifically, a simulation image can be set in advance, which is a complex display image including the compensation area. For example, FIG. 4 shows a schematic diagram of subdivision of the compensation area. The sub-area is usually a rectangular area, and it should be understood that a size of the rectangular area depends on computing power of a graphics card of the color sequential display described above. For example, the higher the computing power of the graphics card, the smaller the size of the rectangular area, and the larger the number of sub-areas obtained by subdivision.

Considering that a color at an edge position of the sub-area changes obviously when a color break up phenomenon occurs, edge position information of each sub-area can be acquired, and the edge position information is used to indicate a position of the sub-area in the simulation image. Then, the color value corresponding to the edge position of each sub-area can be read separately to obtain a color value set.

In the embodiment of the present disclosure, the complex display image can be sub-divided to obtain a plurality of sub-areas, thereby facilitating subsequent color compensation for a plurality of the sub-areas, thereby refining the compensation granularity and improving the compensation effect.

In an alternative embodiment, step S103 described above specifically includes the following process:
(1) a target sub-area among the sub-areas in which a color value corresponding to the edge position information is the same as the deviation color value is determined; and
(2) second difference information between a target color value corresponding to the target sub-area and the display color value is determined, and a step of determining color compensation parameters is performed based on the second difference information, so as to adjust an image color corresponding to the target sub-area based on the color compensation parameters.

In the embodiment of the present disclosure, firstly, a deviation color value corresponding to each sub-area can be calculated and compared with the read color value corresponding to the edge position of the sub-area. The same deviation color value as the read color value indicates that color break up has occurred in the sub-area. At this time, the sub-area can be determined as the target sub-area, so as to compensate the sub-area. The deviation color value different from the read color value indicates that no color break up occurs in the sub-area. At this time, the sub-area can be filtered out.

After the target sub-area is determined, the target color value corresponding to the target sub-area can be determined, and the target color value is used to indicate a color value of the target sub-area when no color break up occurs. Here, the target color value can be read according to the color compensation parameters of the simulation image. Then, the second difference information between the target color value and the display color value can be calculated, and the step of determining the color compensation parameters can be performed based on the second difference information, so as to compensate the target sub-area based on the color compensation parameters. The determining step is specifically described in step S105 described above and is not described here again.

In the embodiment of the present disclosure, the deviation color value corresponding to the sub-area can be compared with the current color value, so as to determine the target sub-area where the color break up occurs, so as to perform color compensation on the target sub-area, and improve accuracy of color compensation.

In an alternative embodiment, determining the first difference information between the current display color value and the deviation color value corresponding to the compensation area in step S103 specifically includes the following process:

S1031, eye movement information corresponding to the eye movement behavior is monitored, and the eye movement information includes an eye movement speed and an eye movement trajectory;

S1032, a deviation color value corresponding to the compensation area is determined based on the eye movement information; and S1033, the first difference information is determined according to a difference between the display color value and the deviation color value.

In the embodiment of the present disclosure, the eye movement speed can indicate a sight movement speed of the target subject, and the eye movement trajectory can indicate a sight movement trajectory of the target subject. For example, the eye movement trajectory can include translation, circular motion and the like. Herein, the color sequential display can include a motion capture module for the eyeball. For example, wearable products with AR, VR and the like most includes a motion capture module to meet part of functional requirements. In this solution, an actual movement direction of the eyeball is determined by using a motion capture module to capture a movement mode of retina of the eyeball (the motion capture module usually functions by capturing reflection of the eyeball, tracking iris or the like). It should be understood that the eye movement information of the eye movement behavior can also be collected in other ways, and a specific way to determine the eye movement information is not repeated in the disclosure, whichever is achievable.

After the eye movement information is collected, the imaging image of the display image displayed on the color sequential display in the eyes of the target subject can be calculated, and the compensation area in which the color break up phenomenon occurs can be determined based on the imaging image. A specific way to determine the imaging image and the compensation area therein is as follows, which is not be described here in detail.

Then, the imaging image can be input into a target color model, so that the target color model can calculate the deviation color value of the compensation area when the color break up phenomenon occurs by a color algorithm. Here, the deviation color value matching the eye movement information can be calculated by the color algorithm, and specifically, color deviation of the compensation area from the display color value when the color break up occurs can be calculated based on the eye movement speed, so as to obtain the deviation color value.

In the embodiment of the disclosure, the imaging image of the display image displayed on the color sequential display in the eyes of the target subject can be calculated, and the compensation area in which the color break up occurs can be determined based on the imaging image, so that compensation can be performed on the compensation area to improve watching experience of the target subject.

In an alternative embodiment, step S103 described above specifically includes the following process:

S11: multiple pieces of eye movement information to be tested is determined in advance, and motion information of a photographing subject corresponding to each piece of the eye movement information to be tested is determined;

S12, a display image of the color sequential display under the motion information is collected by the photographing subject;

S13, a color break up image is determined in the display image, and a display color value corresponding to a compensation area in the color break up image is determined; and S14: a color model to be trained is trained based on the color break up image and the corresponding display color value to obtain a target color model, so as to perform a step of determining the deviation color value corresponding to the compensation area based on the target color model.

In the embodiment of the disclosure, considering that the imaging image in the eyes of the target subject corresponding to the display image is not easy to be visualized, a target color model that can generate a visualized imaging image based on the eye movement information can be trained first, and the target color model can also predict the compensation area and deviation color value in the imaging image.

Specifically, considering that the CBU phenomenon is caused by relative displacement between the eyeball and the display area, if we can use a high-speed camera to simulate movement of the eyeball with a large amount of high-speed photographic processing, images with the CBU phenomenon can be obtained. Therefore, first, eye movement information to be tested corresponding to various eye movement behaviors can be determined respectively, and the eye movement information to be tested includes the eye movement speed and the eye movement trajectory. Then, the motion information of the photographing subject can be determined based on the eye movement information to be tested, so that the photographing subject simulates the eye movement behavior of the target subject, so as to collect the display image of the target subject in the eye movement process. Here, an angular velocity of the photographing subject during rotation can be determined based on the eye movement speed, and a movement trajectory corresponding to the photographing subject can be determined based on the eye movement trajectory.

Figure 5:
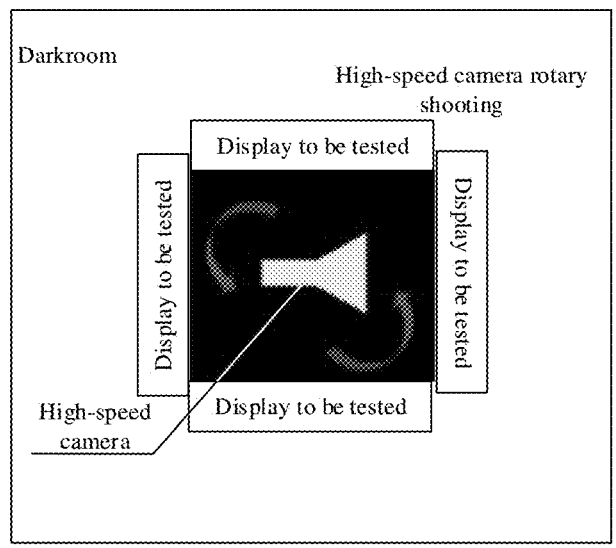
FIG. 5 shows a schematic diagram of collecting a display image by a photographing subject according to an embodiment of the present disclosure.

FIG. 5 is a schematic diagram of collecting a display image by the photographing subject, and the photographing subject may be a high-speed camera. Specifically, displays to be tested can be provided at upper, lower, left and right positions in a darkroom. The high-speed camera is placed in the middle of the displays to be tested with a certain distance between the displays and the high-speed camera. The high-speed camera is placed and fixed on a rotary table that can rotate at a high speed, and the high-speed rotating rotary table can drive the high-speed camera to move according to the angular velocity and the moving trajectory indicated by the motion information.

Meanwhile, the camera can shoot at a high speed during movement to obtain the display image of the color sequential display under each piece of motion information. Then, the obtained display image can be analyzed to determine the color break up image in the display image. Here, taking a general high-speed camera as an example, 120 shots can be taken per second.

Figure 6:
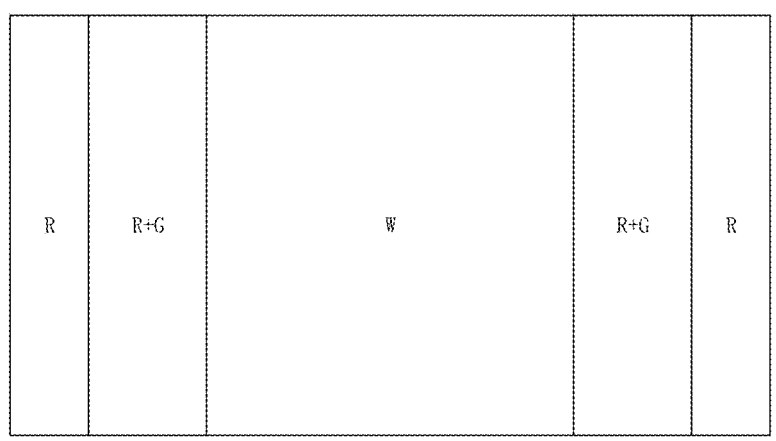
FIG. 6 shows a simulation diagram of a CBU phenomenon according to an embodiment of the present disclosure.

Specifically, FIG. 6 is a simulation view of the CBU phenomenon, in which R, R+G and G+B areas are areas where the color break up occurs. It should be understood that the trajectory of the eye movement behavior corresponding to the CBU phenomenon simulation view is left-right translation. In actual use, positions of areas where color break up is caused by different movement trajectories are different, which will not be exhaustively listed herein.

After being determined, the color break up image can be divided to obtain the compensation area, and the display color value in the compensation area can be read. Then, the target color value of the display image can be determined. Generally speaking, in order to observe the color break up phenomenon, the display image is usually set to be white, and the target color value is an RGB value corresponding to white, that is, (255, 255, 255).

Then, a training data set can be created based on the target color value, the display color value, the color break up image and the motion information, and a color model to be trained can be trained based on the training data set, so as to obtain a target color model with confidence of a prediction result meeting use requirements. Here, the target color model can predict the deviation color value corresponding to the compensation area based on the input imaging image.

In the embodiment of the present disclosure, the movement of the eyeball can be simulated by the high-speed camera with a large amount of high-speed photographic processing of the display image to obtain images with the CBU phenomenon, so as to visualize the imaging image in the eyes of the target subject corresponding to the display image.

In an alternative embodiment, determining multiple pieces of eye movement information to be tested in advance in step S11 described above specifically includes the following process:

(1) a target eye movement behavior is determined among a plurality of preset eye movement behaviors, the target eye movement behavior being configured to characterize an eye movement behavior of the target subject with a frequency meeting a preset frequency when the target subject watches the display image; and (2) the eye movement information to be tested is determined based on the eye movement information corresponding to the target eye movement behavior.

In the embodiment of the present disclosure, considering that different types of displays have different sizes and specific eye movement behaviors are different when the color break up occurs, a target eye movement behavior can be set corresponding to the type of the color sequential display. For example, when the color sequential display is a head-mounted product, an eye movement behavior with the highest frequency is the saccade and eyeball following. At this time, the saccade and the eye following can be determined as target eye movement behaviors with the frequency meeting the preset frequency.

After the target eye movement behaviors are determined, multiple groups of eye movement information to be tested can be created based on eye movement information of the target eye movement behaviors. Taking the eye movement speed as an example, generally speaking, the eye movement speed of the saccade is 400 degrees/second, and the eye movement speed of the eyeball following is 100 degrees/second. On this basis, multiple pieces of eye movement information to be tested can be created based on an eye movement speed interval of the target eye movement behaviors. For example, the eye movement speeds corresponding to the eye movement information to be tested may be 400 degrees/second, 300 degrees/second, 200 degrees/second and 100 degrees/second.

In the embodiment of the present disclosure, multiple pieces of eye movement information to be tested can be created based on the eye movement speed interval corresponding to the target eye movement behaviors, so that all the target eye movement behaviors can be covered when the color model to be trained is trained based on the eye movement information to be tested.

In an alternative embodiment, the display color value includes an RGB value, and determining the display color value corresponding to the compensation area in the color break up image in step S13 specifically includes the following process:

(1) a lamp bead in the color sequential display corresponding to the compensation area in the color break up image is positioned;

(2) coordinates of the compensation area are determined based on the lamp bead; and (3) an RGB value corresponding to the coordinates is looked up through a preset lookup statement.

Figures 7, 8:
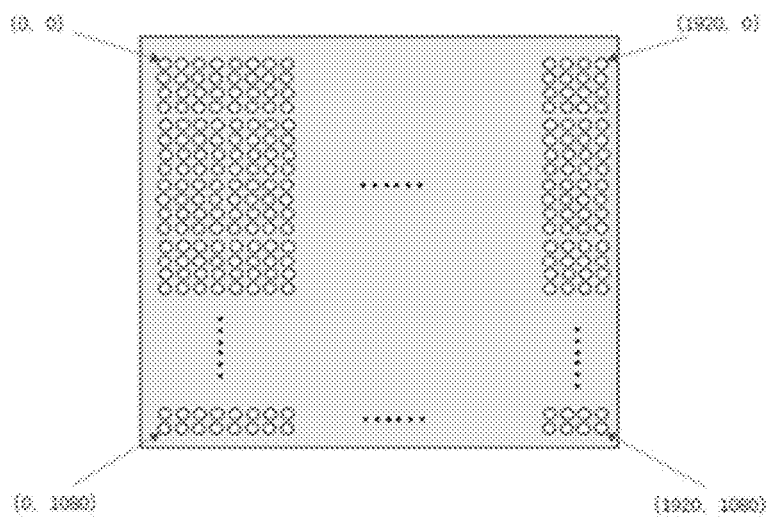
FIG. 7 shows a schematic diagram of a backlight module composed of a miniLED lamp bead array according to an embodiment of the present disclosure.
FIG. 8 shows a schematic diagram of part of hexadecimal color data according to an embodiment of the present disclosure.

In the embodiment of the present disclosure, the color sequential display is usually a backlight module composed of a light-emitting lamp bead array, and on this basis, the compensation area can be positioned with an x-y axis of the lamp beads. As shown in FIG. 7, a backlight module is composed of an array of miniLED lamp beads which includes 1920*1080 miniLED lamp beads.

Specifically, getpixel is a function to obtain a screen color with a return value being a color of an int type, where getpixel is the preset lookup statement. For example, int c=getpixel(100, 100) indicates that the statement will return a color value at coordinates (100, 100). Here, the color data is represented with the int type, with a color format of 0xbbggrr after conversion to a hexadecimal type, where bb/gg/rr respectively represent two-digit hexadecimal blue/green/red color values, and each color ranges from 0x0 to 0xff, which ranges from 0 to 255 after conversion to a decimal type. Specifically, FIG. 8 is a schematic diagram of part of hexadecimal color data.

It should be understood that compensation for the compensation area can be realized by a bit operation, and running codes of the bit operation is as follows:

```
void main( )
{
  Initgraph(640,480);
  //Read pictures
  loadimage(NULL,L"test.jpg");
  int c;
  for (int x=0;x<640;x++)
  for (int y=0;x<480;y++)
```

```
{
    c=getpixel(x,y);
    c &=0xffff00;
    putpixel(x,y,c);
}
```

First, the simulation view of the CBU phenomenon can be acquired through Initgraph(640,480), and then the compensation area in the simulation view of the CBU phenomenon is determined through for (int x=0; x<640; x++) and for (int y=0; x<480; y++). Then, the color value at coordinates (x, y) in the compensation area can be obtained through c=getpixel (x, y). Then, it can be determined that a color value c&=0xffff00 needs to be compensated for at a position (x, y), and the color value at the position (x, y) can be compensated for 0xffff00 through putpixel (x, y, c).

In the embodiment of the present disclosure, in the color sequential display, a backlight module is usually composed of an array of light-emitting lamp beads, and on this basis, the compensation area can be positioned with the x-y axis of the lamp beads, thereby improving efficiency of positioning the compensation area.

Figure 9:
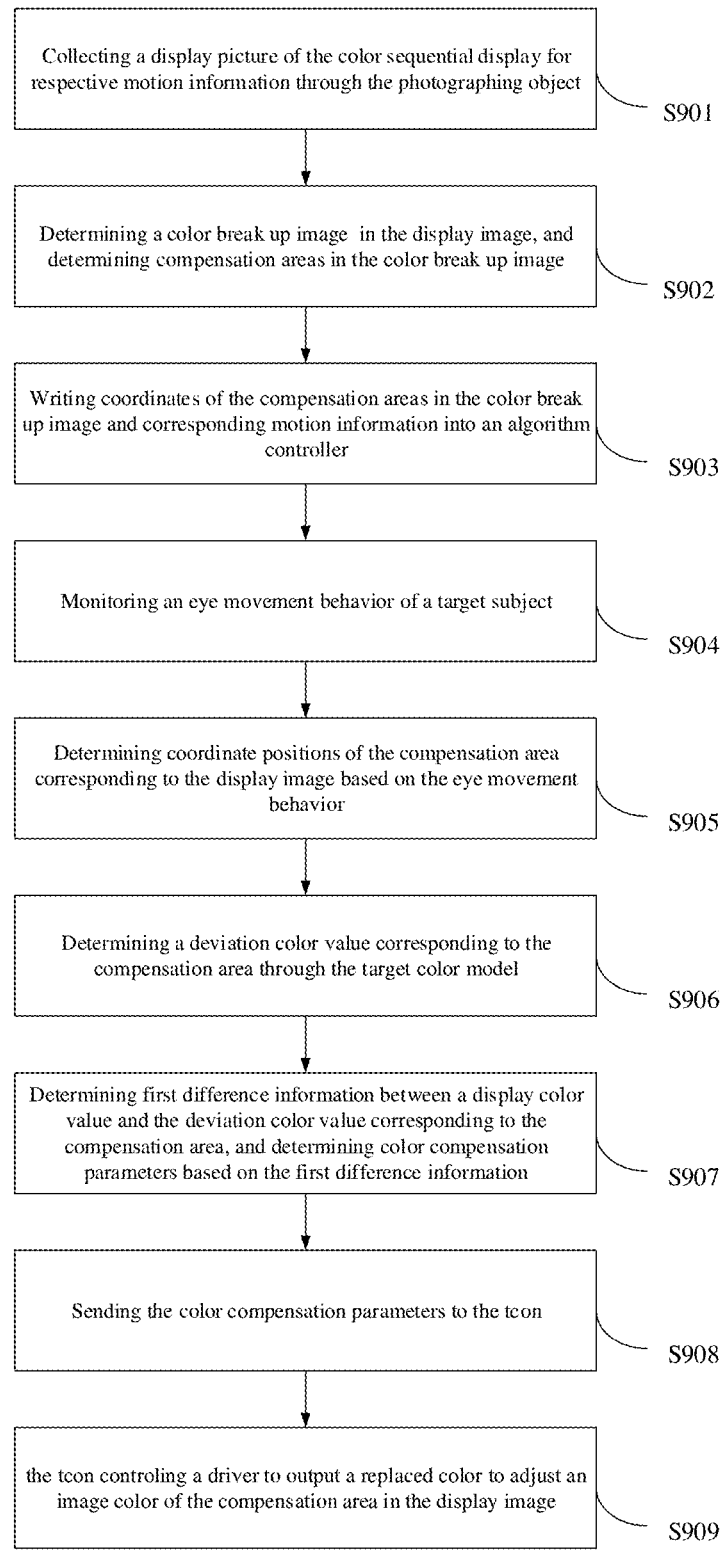
FIG. 9 shows a flowchart of another display image compensation method according to an embodiment of the present disclosure.

FIG. 9 is a flowchart of another display image compensation method according to an embodiment of the present disclosure. The method includes steps S901 to S909.

In step S901, a display image of the color sequential display under each piece of motion information is collected by the photographing subject.

In step S902, a color break up image is determined in the display image, and compensation areas in the color break up image are determined.

In step S903, coordinates of the compensation areas in the color break up image and corresponding motion information are written into an algorithm controller.

In step S904, an eye movement behavior of a target subject is monitored.

In step S905, coordinate positions of the compensation area corresponding to the display image are determined based on the eye movement behavior.

In step S906, a deviation color value corresponding to the compensation area can be determined through the target color model.

In step S907, first difference information between a display color value and the deviation color value corresponding to the compensation area is determined, and color compensation parameters are determined based on the first difference information.

In step S908, the color compensation parameters are sent to the tcon board.

In step S909, the tcon board controls a driver to output a replaced color to adjust an image color of the compensation area in the display image.

In the embodiment of the present disclosure, a method for determining the compensation area in the color break up image is as described in the embodiment corresponding to step S103 described above, which will not be repeated here.

In the embodiment of the present disclosure, the algorithm controller can train the color model to be trained based on the coordinates of the compensation areas in the color break up image and the corresponding motion information, and a specific training process is as described in the embodiment corresponding to step S103 described above, which will not be repeated here.

In the embodiment of the present disclosure, a way to monitor the eye movement behavior of the target subject and determine the coordinates of the compensation area corresponding to the display image based on the eye movement behavior is as described in the embodiment corresponding to FIG. 1, which will not be repeated here.

In the embodiment of the present disclosure, a way to determine the deviation color value corresponding to the compensation area through the target color model is as described in the embodiment corresponding to step S103 described above, which will not be repeated here.

In the embodiment of the present disclosure, a way to determine the color compensation parameters and perform color compensation on the compensation area through the tcon board is as described in the embodiment corresponding to FIG. 1 described above, which will not be repeated here.

In summary, in the embodiments of the disclosure, when an eye movement behavior of a target subject is monitored, a compensation area in a display image is determined based on the eye movement behavior. The compensation area is an area where a color break up phenomenon occurs in the display image during watching of the target subject due to the eye movement behavior. Next, a current display color value of the compensation area is acquired, and first difference information between the current display color value and a deviation color value of the compensation area is determined. Then, a color compensation parameter is determined based on the first difference information, and an image color of the compensation area in the display image is adjusted according to the color compensation parameter, so as to compensate the display image where a color break up phenomenon occurs to improve the user's watching experience.

It is understood by those skilled in the art that in specific embodiments of the above method, the order in which the steps are written does not imply any limitation of the implementation process by implying a strict order of execution, and that the specific order in which the steps are to be executed should be determined in terms of their functionality and possible internal logic.

Based on the same inventive concept, the present disclosure embodiments also provide a display screen compensation device corresponding to the display screen compensation method, and since the device in the present disclosure embodiments solves the problem on a principle similar to the above-described display screen compensation method of the present disclosure embodiments, the implementation of the device can be referred to the implementation of the method, and the repetitions will not be repeated.

Figure 10:
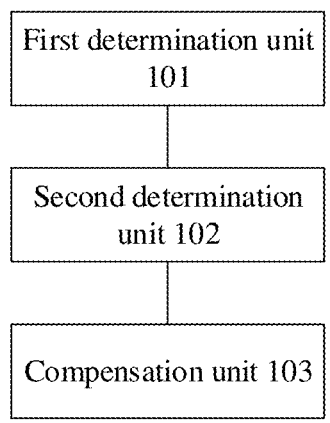
FIG. 10 shows a schematic diagram of a display image compensation device according to an embodiment of the present disclosure.

FIG. 10 shows a schematic diagram of a display image compensation device according to an embodiment of the present disclosure. The device includes:

a first determination unit 101 configured to, when an eye movement behavior of a target subject is monitored, determine a compensation area in a display image based on the eye movement behavior, wherein the compensation area is an area where a color break up phenomenon occurs in the display image during watching of the target subject due to the eye movement behavior;

a second determination unit 102 configured to acquire a current display color value of the compensation area, and determine first difference information between the current display color value and a deviation color value of the compensation area; and a compensation unit 103 configured to determine a color compensation parameter based on the first difference information, and adjust an image color of the compensation area in the display image according to the color compensation parameter.

In the embodiment of the disclosure, when an eye movement behavior of a target subject is monitored, a compensation area in a display image is determined based on the eye movement behavior. The compensation area is an area where a color break up phenomenon occurs in the display image during watching of the target subject due to the eye movement behavior. Next, a current display color value of the compensation area is acquired, and first difference information between the current display color value and a deviation color value of the compensation area is determined. Then, a color compensation parameter is determined based on the first difference information, and an image color of the compensation area in the display image is adjusted according to the color compensation parameter, so as to compensate the display image where a color break up phenomenon occurs to improve the user's watching experience.

In some embodiments, the second determination unit 102 is further configured to:
monitor eye movement information corresponding to the eye movement behavior, the eye movement information including an eye movement speed and an eye movement trajectory;
determine a deviation color value corresponding to the compensation area based on the eye movement information; and
determine the first difference information according to a difference between the display color value and the deviation color value.

In some embodiments, the second determination unit 102 is further configured to:
determine multiple pieces of eye movement information to be tested in advance, and determine motion information of a photographing subject corresponding to each piece of the eye movement information to be tested;
collect a display image of the color sequential display under the motion information by the photographing subject;
determine a color break up image in the display image, and determine a display color value corresponding to a compensation area in the color break up image; and
train a color model to be trained based on the color break up image and the corresponding display color value to obtain a target color model, so as to determine the deviation color value corresponding to the compensation area based on the target color model.

In some embodiments, the second determination unit 102 is further configured to:
determine a target eye movement behavior among a plurality of preset eye movement behaviors, the target eye movement behavior being configured to characterize an eye movement behavior of the target subject with a frequency meeting a preset frequency when the target subject watches the display image; and
determine the eye movement information to be tested based on the eye movement information corresponding to the target eye movement behavior.

In some embodiments, the display color value includes an RGB value, and the second determination unit 102 is further configured to:
position a lamp bead in the color sequential display corresponding to the compensation area in the color break up image;
determine coordinates of the compensation area based on the lamp bead; and
look up an RGB value corresponding to the coordinates through a preset lookup statement.

In some embodiments, the compensation area includes a plurality of sub-areas, and the second determination unit 102 is further configured to:
acquire edge position information of each of the sub-areas, and read a color value corresponding to the edge position information of each of the sub-areas to obtain a color value set; and
determine the color value set as the current display color value of the compensation area.

In some embodiments, the second determination unit 102 is further configured to:
determine a target sub-area among the sub-areas in which a color value corresponding to the edge position information is the same as the deviation color value; and
determine second difference information between a target color value corresponding to the target sub-area and the display color value, and determine color compensation parameters based on the second difference information, so as to adjust an image color corresponding to the target sub-area based on the color compensation parameters.

The description of the processing flow of each unit in the device, and the interaction flow between the units can be referred to the relevant description in the above-described method embodiment, and will not be described in detail herein.

Figure 11:
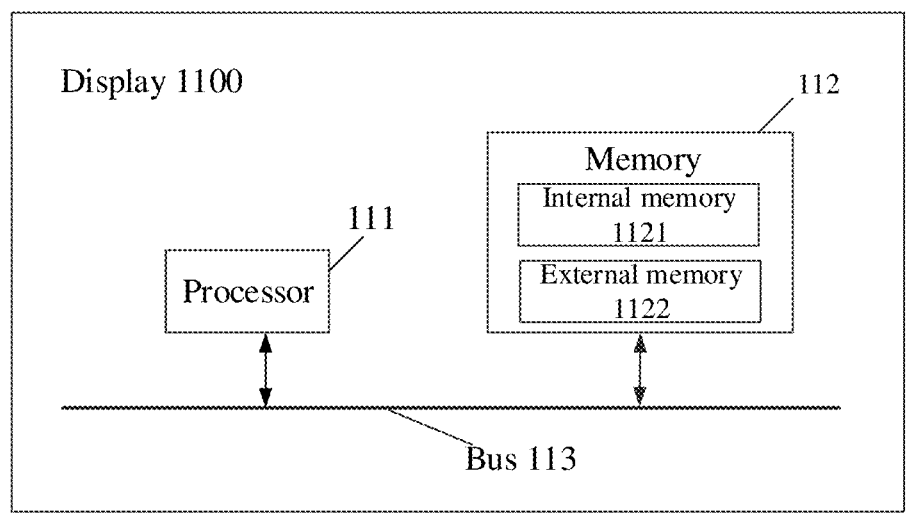
FIG. 11 shows a schematic diagram of a display according to an embodiment of the present disclosure.

Corresponding to the display image compensation method in FIG. 1, an embodiment of the present disclosure further provides a display 1100 as shown in FIG. 11, which is a schematic structural diagram of the display 1100 according to the embodiment of the present disclosure, including:
a processor 111, a memory 112, and a bus 113; the memory 112 is configured to store execution instructions and includes an internal memory 1121 and an external memory 1122. The internal memory 1121 here is configured to temporarily store operation data in the processor 111 and data exchanged with the external memory 1122 such as a hard disk. The processor 111 is configured to exchange data with the external memory 1122 through the internal memory 1121. When the display 1100 operates, the processor 111 communicates with the memory 112 through the bus 113, so that the processor 111 execute the following instructions:
when an eye movement behavior of a target subject is monitored, determining a compensation area in a display image based on the eye movement behavior, wherein the compensation area is an area where a color break up phenomenon occurs in the display image during watching of the target subject due to the eye movement behavior;
acquiring a current display color value of the compensation area, and determining first difference information between the current display color value and a deviation color value of the compensation area; and
determining a color compensation parameter based on the first difference information, and adjusting an image color of the compensation area in the display image according to the color compensation parameter.

An embodiment of the present disclosure further provides a computer-readable storage medium on which a computer program is stored, and when the computer program is executed by a processor, steps of the display image compensation method described in the above method embodiment are performed. The storage medium may be a volatile or nonvolatile computer-readable storage medium.

An embodiment of the present disclosure further provides a computer program product, which carries a program code including instructions configured to perform steps of the display image compensation method described in the above method embodiment, which can specifically refer to the above method embodiment and will not be repeated here.

The computer program product can be realized in hardware, software or a combination thereof. In an alternative embodiment, the computer program product is embodied as a computer storage medium. In another alternative embodiment, the computer program product is embodied as a software product, such as a software development kit (SDK).

A person skilled in the art may clearly understand that, for convenience and brevity of description, the specific operation process of the above system and device may refer to the corresponding process in the above method embodiments, and details are not described herein again. In the several embodiments provided in the present disclosure, it should be understood that the disclosed system, device and method can be implemented in other ways. The above-described embodiments of the device are only schematic, for example, division of the units is only logical function division, and there may be other ways of division in actual implementation, for example, a plurality of units or components can be combined or integrated into another system, or some features can be ignored or not executed. On the other hand, mutual coupling or direct coupling or communication connection shown or discussed may be indirect coupling or communication connection through some communication interfaces, devices or units, and may be in electrical, mechanical or other forms.

The units illustrated as separate components may or may not be physically separate, the components shown as units may or may not be physical units, that is, may be located in one place or distributed to a plurality of network elements. The purpose of the embodiment may be implemented by selecting some or all of the units therein according to actual needs.

In addition, the functional units in the embodiments of the present disclosure may be integrated into one processing unit, or the functional units may be present separately physically, or two or more functional units may be integrated into one unit.

If the functions are realized in the form of software function units and sold or used as an independent product, the functions may be stored in a non-volatile computer-readable storage medium that can be executed by a processor. Based on this understanding, the technical solutions of the present disclosure essentially or the part that contributes to the prior art or a part of the technical solutions may be embodied in the form of a software product which is stored in a storage medium and includes several instructions to cause a computer device (which may be a mobile phone, a personal computer, a server, a network device, or the like) to execute all or part of steps of the method described in the embodiments of the disclosure. The above storage medium includes: various media capable of storing program codes such as a USB flash disk, a mobile hard disk, a read-only memory (ROM), a random access memory (RAM), a magnetic disk or an optical disk.

At last, it should be noted that: the above embodiments are only specific embodiments of the present disclosure, and are used to describe the technical solutions of the present disclosure rather than limiting them, and the scope of protection of the present disclosure is not limited thereto; although the present disclosure has been described in detail with reference to the foregoing embodiments, a person skilled in the art in the art should understand that: Within the technical scope disclosed in the present disclosure, any person skilled in the art can still modify the technical solutions described in the foregoing embodiments or easily think of changes, or make equivalent replacements for some technical features thereof; however, these modifications, changes, or substitutions do not cause the essence of the corresponding technical solutions to depart from the spirit and scope of the technical solutions of the embodiments of the present disclosure, and should be fall within the scope of protection of the present disclosure. Therefore, the protection scope of the disclosure shall be based on the protection scope of the claims.

What is claimed is:

1. A display image compensation method applied to a color sequential display, comprising:
when an eye movement behavior of a target subject is monitored, determining a compensation area in a display image based on the eye movement behavior, wherein the compensation area is an area where a color break up phenomenon occurs in the display image during watching of the target subject due to the eye movement behavior;
acquiring a current display color value of the compensation area, and determining first difference information between the current display color value and a deviation color value of the compensation area; and
determining a color compensation parameter based on the first difference information, and adjusting an image color of the compensation area in the display image according to the color compensation parameter.

2. The display image compensation method according to claim 1, wherein the eye movement behavior is relative displacement occurring between an eyeball and a display area of the color sequential display and comprises: saccade, eyeball following, reading, and free-style search.

3. The display image compensation method according to claim 1, wherein determining a compensation area in a display image based on the eye movement behavior comprises:
calculating an imaging image of the display image displayed by the color sequential display in eyes of the target subject based on an eye movement speed and an eye movement trajectory of the eye movement behavior, and determining a compensation area in which a color break up phenomenon occurs based on the imaging image.

4. The display image compensation method according to claim 1, wherein determining the first difference information between the current display color value and the deviation color value corresponding to the compensation area comprises:
monitoring eye movement information corresponding to the eye movement behavior, the eye movement information comprising an eye movement speed and an eye movement trajectory;
determining a deviation color value corresponding to the compensation area based on the eye movement information; and
determining the first difference information according to a difference between the display color value and the deviation color value.

5. The display image compensation method according to claim 4, wherein determining a deviation color value corresponding to the compensation area based on the eye movement information comprises:
 inputting the imaging image into a target color model, so that the target color model calculates by a color algorithm the deviation color value corresponding to the compensation area in which a color break up phenomenon occurs.

6. The display image compensation method according to claim 1, further comprising:
 determining multiple pieces of eye movement information to be tested in advance, and determining motion information of a photographing subject corresponding to each piece of the eye movement information to be tested;
 collecting a display image of the color sequential display under the motion information by the photographing subject;
 determining a color break up image in the display image, and determining a display color value corresponding to a compensation area in the color break up image; and
 training a color model to be trained based on the color break up image and the corresponding display color value to obtain a target color model, so as to determine the deviation color value corresponding to the compensation area based on the target color model.

7. The display image compensation method according to claim 6, wherein training a color model to be trained based on the color break up image and the corresponding display color value to obtain a target color model comprises:
 creating a training data set based on a target color value, the display color value, the color break up image and the above motion information, and training a color model to be trained based on the training data set, so as to obtain a target color model with confidence of a prediction result meeting use requirements.

8. The display image compensation method according to claim 6, wherein determining multiple pieces of eye movement information to be tested in advance comprises:
 determining a target eye movement behavior among a plurality of preset eye movement behaviors, the target eye movement behavior being configured to characterize an eye movement behavior of the target subject with a frequency meeting a preset frequency when the target subject watches the display image; and
 determining the eye movement information to be tested based on the eye movement information corresponding to the target eye movement behavior.

9. The display image compensation method according to claim 6, wherein determining the eye movement information to be tested based on the eye movement information corresponding to the target eye movement behavior comprises:
 creating multiple pieces of eye movement information to be tested based on an eye movement speed interval corresponding to the target eye movement behaviors, so that all the target eye movement behaviors are covered when the color model to be trained is trained based on the eye movement information to be tested.

10. The display image compensation method according to claim 6, wherein the display color value comprises an RGB value, and determining the display color value corresponding to the compensation area in the color break up image comprises:
 positioning a lamp bead in the color sequential display corresponding to the compensation area in the color break up image;
 determining coordinates of the compensation area based on the lamp bead; and
 looking up an RGB value corresponding to the coordinates through a preset lookup statement.

11. The display image compensation method according to claim 10, wherein
 the color sequential display is usually a backlight module composed of a light-emitting lamp bead array, and determining coordinates of the compensation area with an x-y axis of the lamp bead.

12. The display image compensation method according to claim 1, wherein the compensation area comprises a plurality of sub-areas, and acquiring the current display color value of the compensation area comprises:
 acquiring edge position information of each of the sub-areas, and reading a color value corresponding to the edge position information of each of the sub-areas to obtain a color value set; and
 determining the color value set as the current display color value of the compensation area.

13. The display image compensation method according to claim 12, further comprising:
 determining a target sub-area among the sub-areas in which a color value corresponding to the edge position information is the same as the deviation color value; and
 determining second difference information between a target color value corresponding to the target sub-area and the display color value, and determining color compensation parameters based on the second difference information, so as to adjust an image color corresponding to the target sub-area based on the color compensation parameters.

14. A display comprising a processor, a memory and a bus, wherein the memory is configured to store computer-readable instructions, and when the display operates, the processor communicates with the memory through the bus, and executes steps of a display image compensation method when executing the computer-readable instructions, the steps comprising:
 when an eye movement behavior of a target subject is monitored, determining a compensation area in a display image based on the eye movement behavior, wherein the compensation area is an area where a color break up phenomenon occurs in the display image during watching of the target subject due to the eye movement behavior;
 acquiring a current display color value of the compensation area, and determining first difference information between the current display color value and a deviation color value of the compensation area; and
 determining a color compensation parameter based on the first difference information, and adjusting an image color of the compensation area in the display image according to the color compensation parameter.

15. A computer-readable storage medium on which computer-readable instructions are stored, wherein steps of a display image compensation method are executed when the computer-readable instructions are executed by a processor, the steps comprising:
 when an eye movement behavior of a target subject is monitored, determining a compensation area in a display image based on the eye movement behavior, wherein the compensation area is an area where a color break up phenomenon occurs in the display image during watching of the target subject due to the eye movement behavior;
 acquiring a current display color value of the compensation area, and determining first difference information between the current display color value and a deviation color value of the compensation area; and determining a color compensation parameter based on the first difference information, and adjusting an image color of the compensation area in the display image according to the color compensation parameter.

\* \* \* \* \*